Dec. 10, 1957  R. O. BIRCHLER ET AL  2,815,905
APPARATUS FOR WINDING COILS ON SPOOLS
Filed April 9, 1951  3 Sheets-Sheet 1

INVENTORS
R. O. BIRCHLER
O. M. NIELSEN
BY
ATTORNEY

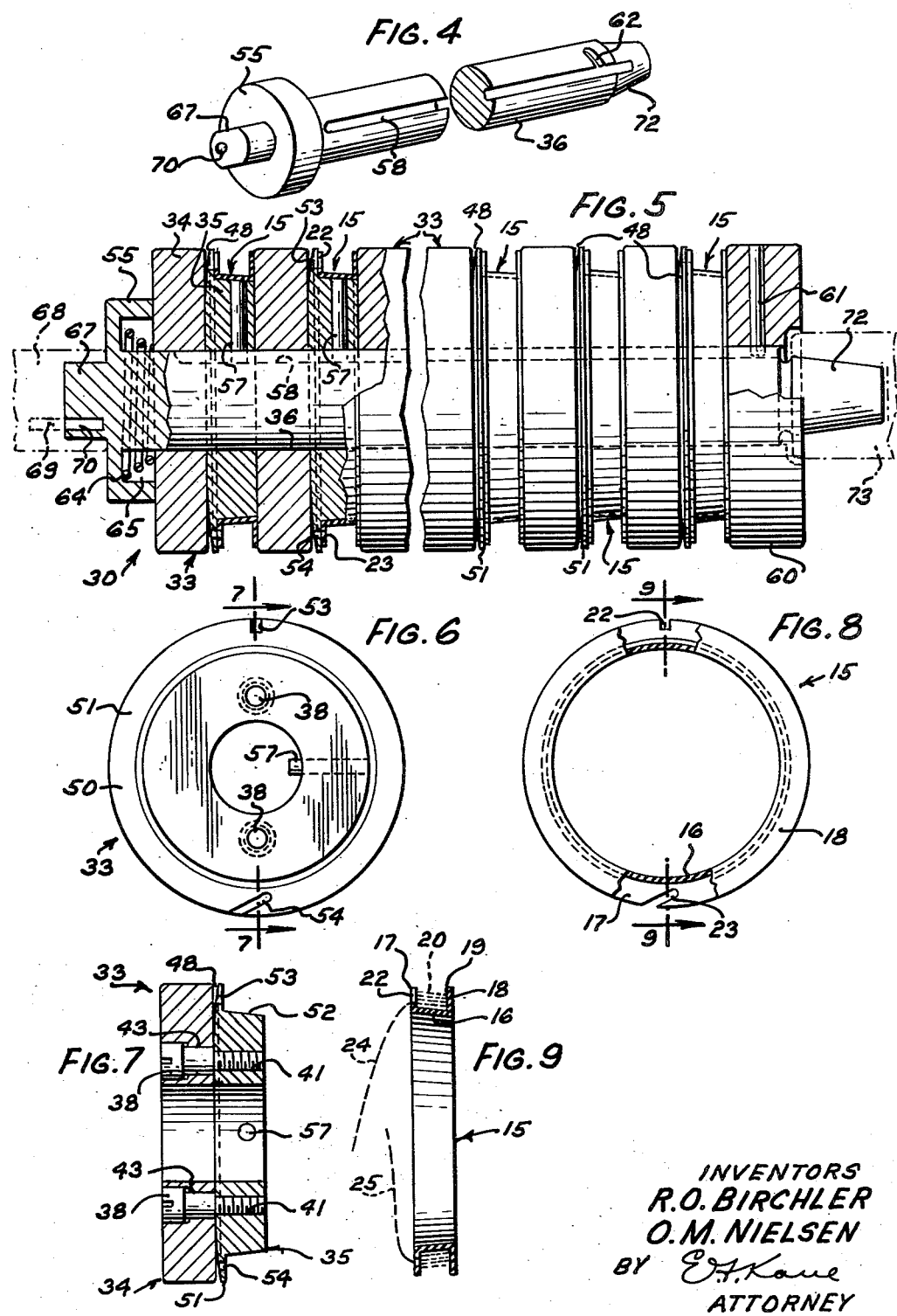

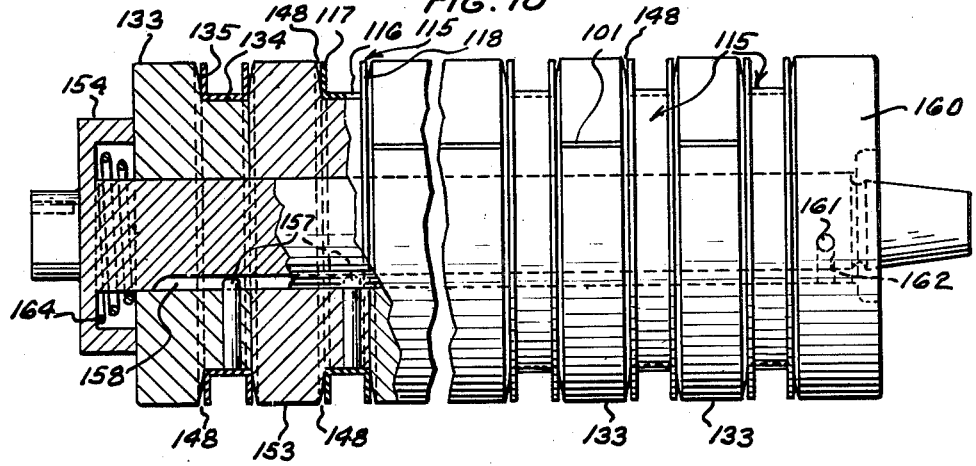
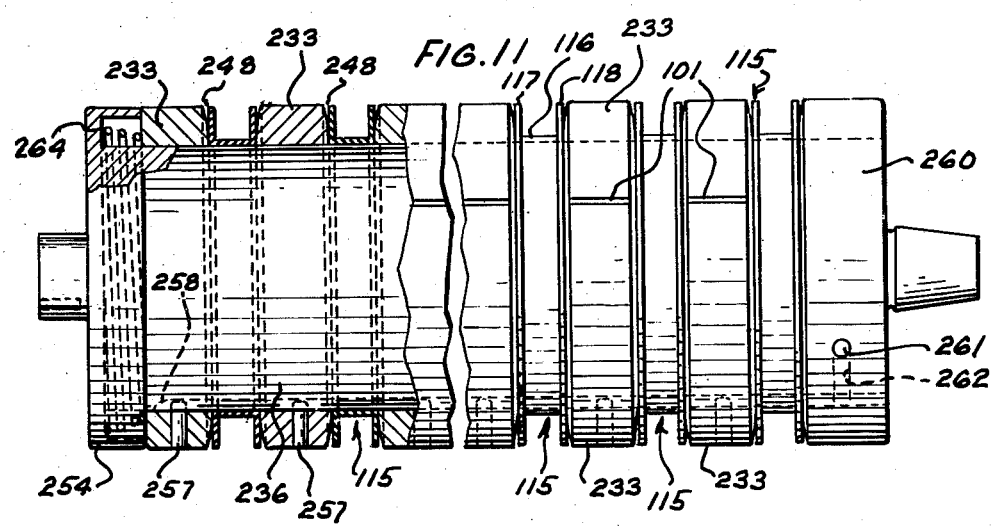

United States Patent Office 2,815,905
Patented Dec. 10, 1957

2,815,905

APPARATUS FOR WINDING COILS ON SPOOLS

Robert O. Birchler, Cicero, and Oliver M. Nielsen, Chicago, Ill., assignors to Western Electric Company, Incorporated, New York, N. Y., a corporation of New York Application April 9, 1951, Serial No. 219,948

12 Claims. (Cl. 242—46.2)

This invention relates to an apparatus for and a method of winding a plurality of coils on spools and more particularly to a composite arbor for supporting a plurality of headed spools thereon for use in a coil winding machine.

In winding a plurality of coils on cylindrical cores, such as sheets of dielectric, which may also be interleaved between successive layers of the windings, various ways have been devised for holding the strands of wire during the beginning and the end of the winding operations so as to expedite the winding of the coils. However, in the winding of coils on cores or spools having heads or flanges on the ends thereof, difficulty has been experienced in simultaneously and expeditiously winding a plurality of such coils because of the problem of securing the ends of the strands of wire on the arbor and winding the initial convolution of strand onto the spools.

It is an object of the invention to provide an improved arbor for supporting a plurality of spools in a coil winding machine and for holding the ends of the strands being wound thereon.

In accordance with one embodiment of the invention as applied to a multiple coil winding machine, a composite arbor is provided for supporting a plurality of spools thereon and having wire gripping grooves therein for holding the end portion of the wires to be wound on the spools. The arbor with the empty spools thereon is applied to the spindle of a winding machine and the end portion of wires from supply reels are moved in a direction transversely of the wires into gripping engagement with the wire gripping grooves in the arbor after which the arbor is rotated and the wires are guided through notches in one of the heads of each spool onto the spools and wound thereon and when the coils have been wound the composite arbor is removed from the spindle of the winding machine and given a lateral twisting movement to carry the wires extending from the machine into slots formed in the heads of the spools to prevent the unwinding of the coils. The arbor with the wound coils thereon is then supported in a holder in laterally spaced and parallel relation to the spindle and an arbor with empty spools theron is applied to the winding spindle and a comb-like member is used to engage the wires at a point thereon between the two arbors and force the wires into gripping engagement with the grooves on the empty arbor and to sever the wires between the arbors.

Other objects and advantages of the invention will become apparent by reference to the following detailed description thereof and the accompanying drawings illustrating a preferred embodiment of the invention, in which:

Fig. 4 is a perspective view of the arbor shaft with portions broken away;

Fig. 5 is an enlarged longitudinal elevational sectional view of the composite arbor in assembled relation and showing the spools supported thereby;

Fig. 6 is a side elevational view of one of the annular spacers and spool supporting members of the composite arbor;

Fig. 7 is a cross-sectional view of the annular spool supporting member taken on the line 7—7 of Fig. 6;

Figs. 8 and 9 are side elevational and sectional views respectively of the spool on which a coil is to be wound;

Figs. 10 and 11 are longitudinal sectional elevational views of modified embodiments of the composite arbors.

Figure 1:
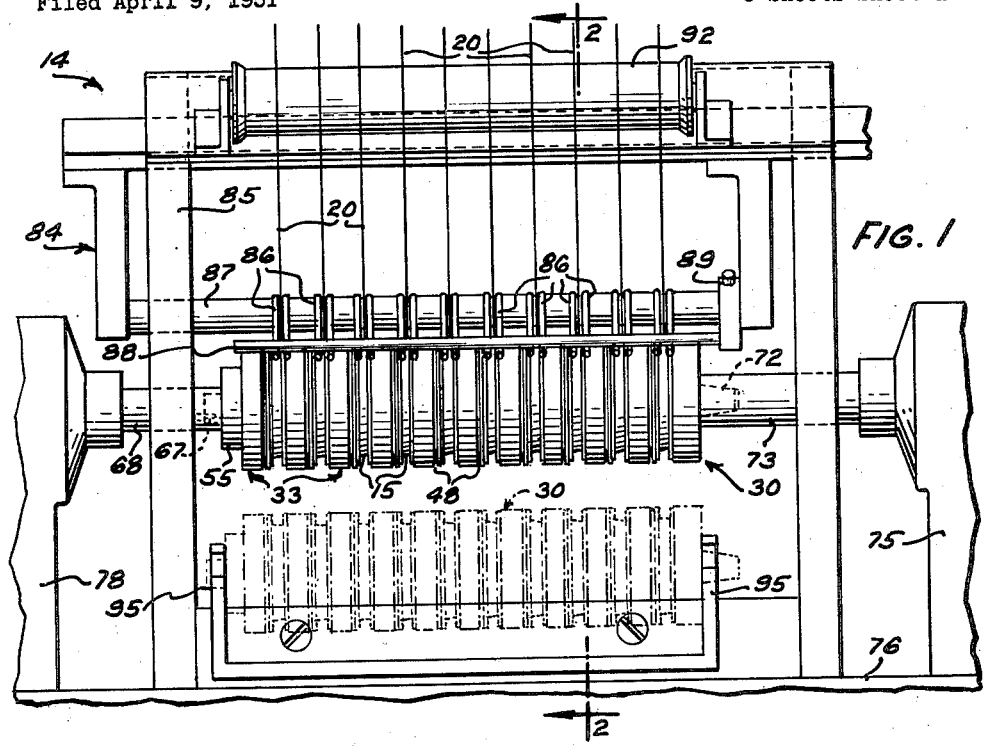
Fig. 1 is a fragmentary front elevational view of a winding machine embodying the present invention.

The present invention is illustrated in connection with a coil winding machine 14 for winding strands of wire on cores or spools 15, Figs. 8 and 9, each of which comprises an annular conical web or wall 16 and a pair of spaced flanges or heads 17 and 18 extending laterally outwardly therefrom to form an annular channel 19 in which the strand 20 is wound to form the coil. The head 17 is provided with a notch or recess 22 through which the strand passes during the initial portion of the winding operation. On completion of the winding of the coil, the strand is hooked or passed into an angular slot 23 also formed in the head 17 to retain the strand and prevent the unwinding of the coil. The ends 24 and 25 of the strand extending through the slots 22 and 23 respectively form leads for the coil wound on the spool.

A plurality of the spools 15 are adapted to be mounted in coaxial and spaced relation to each other on a composite arbor 30, Figs. 1 and 5, comprising an arbor shaft or shank 36 and a plurality of annular spool supporting and spacing elements 33, Figs. 6 and 7. Each of the elements 33 comprises a pair of rings 34 and 35, Fig. 7, having cylindrical apertures for receiving the cylindrical shank 36 and secured together by a pair of shouldered machine screws 38, Fig. 7, secured in threaded apertures 41 in the ring 35 and extending outwardly therefrom through apertures 43 in the ring 34 for supporting the ring 34 for limited axial movement relative to the ring 35. One of the meeting faces of the rings 34 and 35 is beveled slightly to form a narrow annular V-shaped groove 48 for receiving the strand 20 of wire therein for grippingly engaging the wire. The ring 35 is provided with an annular rabbet or groove 50 forming a relatively thin flange 51 engageable with the head 17 on the spool 15 and a conical surface 52 engageable with the web 16 of the spool for supporting the spool 15 in position thereon. The flange 51 of the ring 35 is provided with notches 53 and 54 which are substantially of the same size as the notches 22 and 23 in the spool 15 and with which the notches 22 and 23 are alignable when the spool is assembled on the element 33.

A plurality of the annular spacing elements 33 are assembled on the shank 36 of the arbor as shown in Fig. 5 with the ring 34 of the first element abutting a head or shoulder 55 on one end of the arbor shank 36. Pins 57 on the rings 35 extending radially inwardly into the aperture thereof engage in a keyway 58 in the arbor shank 36 to position the annular elements 33 and the spools 15 previously assembled thereon with the notches 53, 22 and 54, 23, respectively, in axial alignment, and a locking collar 60 having a pin 61 engageable in a bayonet slot 62 in the shank of the arbor serves to lock the annular elements 33 and the spools 15 in assembled relation on the shank 36. The spools 15 are made from slightly resilient thermoplastic material and have axial dimensions slightly greater than the axial distance of the shoulder 52 of the ring 35 so that when the spools 15 are positioned in the grooves 50 in the annular members 33, they extend slightly beyond the outer surface of the ring 35, and when the annular elements 33 and the spools 15 are assembled on the arbor, the spools 15 are slightly compressed when the locking ring 60 is applied to the arbor to lock the components on the arbor. The resiliency of the spools 15 thus serves to maintain the parts in firm and tight engagement with each other.

When spools made from noncompressible material are used, the elements 33 and spools thereon are held in compressed relation by an expansion spring 64 surrounding the arbor shank and disposed within the recess 65 formed in the head 55 of the arbor.

One end 67 of the arbor, which projects beyond the head 55, is flattened to provide a noncircular part which is receivable in a conforming socket in the end of the head stock spindle 68 of the winding machine 14. A pin 69 in the head stock mounted eccentric to the axis of the spindle is receivable in a recess 70 in the end 67 of the arbor to insure the insertion of the arbor end 67 within the socket in only one position. The opposite end 72 of the arbor is tapered and is receivable in a tapered socket in the tail stock 73.

The tail stock spindle 73 is rotatable in a support 75 mounted on a base 76 of the winding machine and is movable axially into and out of engagement with the arbor and is adapted to be locked in engagement with the arbor by conventional locking means not shown. The head stock spindle 68 is likewise mounted for rotation in a support 78 mounted on the base 76 and is adapted to be rotated under control of the operator by a suitable drive means not shown. A distributor 84 mounted for reciprocation in a frame 85 is provided for distributing the wires 20 in the spools 15 during the coil winding operation and comprises pairs of guide fingers 86 fixed to a rod 87 of the distributor 84 for reciprocation therewith. The wires 20 pass between the fingers 86 and under a rod 88 which is supported by an arm 89 on the bar 87 of the distributor and extends parallel to the arbor. Mechanism (not shown) is provided for reciprocating the distributor 84 in timed relation to the rotation of the head stock spindle 68 in a manner well known in the coil winding machine art. The wires 20 are withdrawn from supply reels (not shown) mounted above the winding machine and are guided over a guide roller 92 and into engagement with the distributing fingers 86 and guide rod 88 of the distributor as they are wound onto the spools 15. Slotted arms 95 of a U-shaped bracket 96 fixed to the base 76 form a holder for receiving the ends of a composite arbor having fully wound coils thereon to support the arbor and coils in spaced and fixed relation to the winding spindle 68 prior to the severing of the strands of the wire from the coils.

Figure 2:
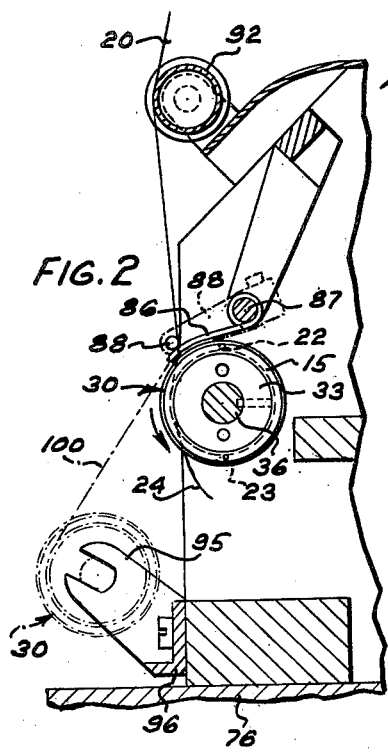
Fig. 2 is a vertical sectional view of a portion of the machine taken on the line 2—2 of Fig. 1 showing an arbor in full lines in operative position on the winding spindle and showing in dotted lines an arbor on which the spools have been completely wound supported in a holder in spaced relation to the winding spindle.

In the operation of winding the coils the spools 15 are assembled on the elements 33 with the notches 22 and 23 of the spools 15 in alignment with the corresponding notches 53 and 54 in the elements 33. The elements 33 with the spools thereon are then assembled on the arbor shank 36 and locked in position by the collar 61. An assembled arbor with the empty spools thereon is then applied to the spindle 68 and locked in position with the tail stock spindle 73 after which the free ends 24 of the wires 20 are moved in a direction transversely to the length thereof into the wire gripping grooves 48 of the spool supporting elements 33 to secure the ends of the wire to the arbor. At the beginning of the winding operation the winding spindle 68 is in a predetermined angular position to receive and position the arbor and the elements 33 and the spools 15 thereon in a predetermined angular position with the notches 22 and 53 in the spools 15 and the elements 33, respectively, positioned as shown in Figs. 2 and 6. In this position the notches 22 and 53 are spaced a relatively small angular distance from and to the rear of the wires 20 as seen in Fig. 2, and the wires 20 as viewed in Fig. 1 with their ends 24 gripped in the grooves 48 are urged to the right by the distributor fingers 86 so that upon rotation of the arbor the wires 20 will ride on the periphery of the flange 51 and fall into the notches 53 and 22 of the flange 51 and the head 17 of the elements 33 and the spools 15, respectively, and enter the channel 19 of the spool and be wound on the spool as the arbor is rotated.

After predetermined lengths of the wires have been wound on the spools the winding spindle 68 is stopped in the same predetermined angular position shown in Fig. 2 after which the tail stock spindle 73 is retracted and the arbor with the wound coils thereon is removed from the spindle 68 by the operator who then turns the arbor to position the slots 23 and 54 of the spools 15 and flanges 51 respectively into close proximity and alignment with the wires 20 and imparts a lateral movement or twist to the arbor to cause the wires 20 to enter the slots 23 and 54 to prevent the uncoiling of the wires from the spools. The arbor with the wound coils thereon is then deposited in the slotted arms 95 and is supported thereby in fixed and spaced relation to the axis of the winding spindle 68. A portion of the wires 20 extend from the wound spools on the arbor to the rod 88 and the distributor fingers 86 as shown in dotted lines in Fig. 2. Another composite arbor with empty spools thereon is inserted in operative position in the machine in driving engagement with the winding spindle 68 and supported by the tail stock spindle 73.

Figures 3, 12:
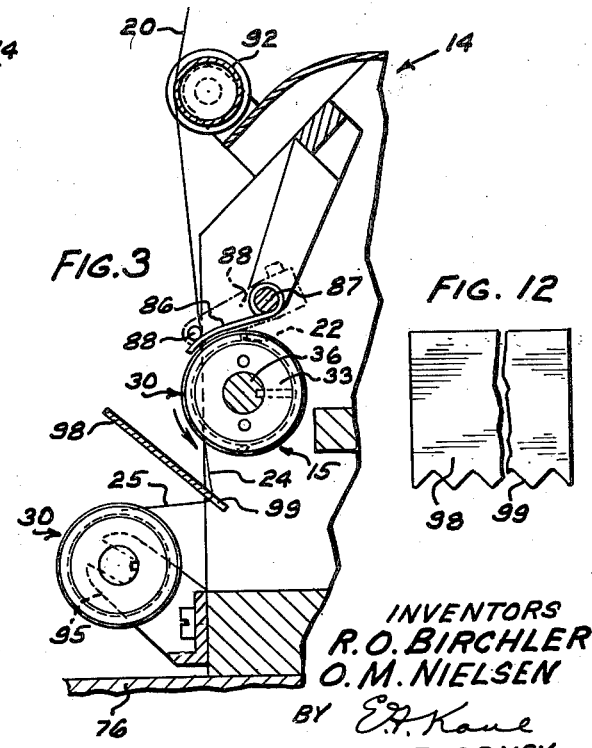
Fig. 3 is a view similar to Fig. 2 showing an arbor having a set of completely wound coils thereon in the holder and an arbor with a set of unwound spools thereon in operative position on the spindle and showing the strands being moved by a comb into gripping engagement with the arbor.
Fig. 12 is a view of a comb member.

A comb member 98 having a serrated edge 99 forming V-shaped grooves spaced apart distances equal to the spacing of the wires 20 and spools 15 is provided to move the wires 20 into engagement with the wire gripping grooves 48 in the arbor on the winding spindle and to sever the portions of the wire extending between the two arbors. This is done by engaging the serrated edge 99 of the comb 98 with the inclined portion 100 of the wires 20, Fig. 2, and moving the comb forwardly and downwardly to the position shown in Fig. 3 which will cause portions of the wires to engage and to be gripped in the grooves 48 of the arbor on the winding spindle after which continued movement of the comb 98 will cause the wires 20 to be severed at the points where they engage the comb. The ends 24 and 25 of the wires 20 formed by the severance of the wires form the leads of the coils as previously stated. The arbor with the fully wound coils thereon may be removed from the holder 95 after which the locking collar is removed from the arbor to permit the elements 33 and the spools 15 with the coils thereon to be slid off of the arbor shank and separated from each other.

The two rings 34 and 35 of the annular spacer elements 33 are preferably secured together as disclosed herein to simplify and expedite the assembling of the spacers and the spools on the arbor but it will be understood that the rings 34 and 35 may be separate and independent of each other and be assembled individually onto the arbor shank 36 if desired.

In the embodiment of the invention shown in Figs. 10 and 11, the spools 115 are rigid and substantially non-resilient or incompressible, and are assembled on the arbor with single spacer elements therebetween, each of which has a slightly tapered face engageable with one head of the spools and cooperating therewith to form a wire gripping groove for receiving and clamping the strands therebetween. The spools 115 are rectangular in cross section and have cylindrical walls or web portions 116 and spaced heads or flanges 117 or 118.

In the construction shown in Fig. 10, the spools 115 are supported on annular spacer elements 133 having cylindrical surfaces 134 for engaging the walls 116 of the spools and having slightly tapered or curved walls 135 engageable with the heads 117 of the spools and cooperating therewith to form V-shaped grooves for receiving and gripping the wires therein when the spools are supported in assembled relation on the composite arbor. The spacer elements 133 are provided with apertures adapted to receive the arbor shaft or shank 136 which is substantially identical with that shown in Figs. 4 and 5. The spacer elements 133 are provided with pins 157 extending inwardly into the central aperture thereof and engageable in a keyway 158 for aligning the annular spacer elements 133 on the arbor shaft in a predetermined annular relation so that wire receiving notches formed in the heads 117 of the spools, similar to the notches 22 and 23 of spools 15, may each be aligned with a groove or line on the periphery of each of the annular spacing elements 133, and in this manner permit the aligning of the spools 115 in predetermined angular position on the arbor. A collar 160 having a pin 161 therein, engageable in a bayonet groove 162 on the arbor shaft, serves to hold the spools 115 and the spacing elements 133 against a head 154 in assembled relation on the arbor. The axial length of a cylindrical shoulder formed by the surface 134 is less than the distance between the outer faces of the heads of the spools so that the spools when assembled on the arbor are held between the tapered or grooved surfaces 135 and the end wall of adjacent spacers 133 and a spring 164 disposed in a groove in a head 154 on the arbor shank 136 stresses the spacing elements 133 and the spools 115 axially against the collar 160 into tight engagement with each other.

In the construction shown in Fig. 11 the shank 236 of the arbor is engageable with the wall 16 of the spools for slidably receiving and supporting the spools 115 thereon. A plurality of annular spacer elements or rings 233 of substantially rectangular cross section are adapted to be assembled on the shank 236 of the arbor between the spools 115 to space the spools in predetermined positions axially on the arbor. The spools 115 and spacer elements 233 are held on the shank 236 against a head 254 on one end of the shank by a collar 260 having a pin engageable with a bayonet lock in the shank 236 of the arbor. A spring 264 disposed in a recess in the head 254 engages one of the spacer elements 233 to urge the elements and spools against the collar 260. One or both of the end faces of the spacer elements 233 may be tapered slightly so that when the elements are assembled on the shank 236 of the arbor against the heads 117 of the spools, they form in cooperation with the head, narrow V-shaped grooves 248 for receiving and gripping the strands forced thereinto. Pins 257 extending inwardly from the elements 233 are engageable in a keyway 258 in the shank 236 to align the elements 233 in a predetermined angular relationship so that the spools 115 may be angularly positioned on the shank of the arbor with the wire receiving notches formed in the heads 117 thereof in alignment with grooves or other aligning marks 101 on the periphery of the elements 233 to align the spools in a predetermined angular position on the arbor.

The method of winding the wire onto the spools 115 assembled on either the arbor constructions shown in Figs. 10 and 11 is the same as that previously described.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A coil winding arbor for supporting a plurality of headed spools during the simultaneous winding of strands of wire thereon comprising members engageable with the heads of said spools, means for removably supporting a plurality of said members and spools in aligned and assembled relation for rotation about an axis concentric with said spools and with said members between the spools, and means on said members adjacent said spools for gripping and frictionally holding portions of said strands.

2. A coil winding arbor for supporting a plurality of headed spools during the simultaneous winding of strands of wire thereon comprising members engageable with the heads of said spools, means for removably supporting a plurality of said members and spools in aligned and assembled relation for rotation about an axis concentric with said spools and with said members between the spools, and annular grooves in said members forming opposed cooperating surfaces for gripping and frictionally holding portions of said strands adjacent said spools.

3. A coil winding arbor for supporting a plurality of spools during the simultaneous winding of strands of wire thereon comprising a rotatable arbor member for supporting a plurality of spools thereon, means for spacing said spools in a predetermined relation to each other on said member and for providing cooperating opposed strand gripping surfaces for receiving and frictionally holding the ends of said strands adjacent to the spools, and means for removably retaining said spools and said spacing means on said arbor member.

4. A coil winding arbor for supporting a plurality of spools during the simultaneous winding of strands of wire thereon comprising an arbor member for receiving a plurality of spools thereon, apertured strand gripping elements receivable on said arbor member for supporting said spools in predetermined axially spaced relation to each other, each of said elements comprising a pair of relatively movable members having a pair of cooperating surfaces forming an annular groove for receiving a strand therein and frictionally holding said strand adjacent a spool, and means for urging said spools and elements together on said arbor member.

5. A coil winding arbor for supporting a plurality of spools during the simultaneous winding of strands of wire thereon comprising a rotatable arbor for supporting a plurality of spools thereon, apertured elements receivable on said arbor member for spacing said spools in predetermined relation to each other, said elements comprising pairs of members having pairs of cooperating abutting surfaces forming annular substantially V-shaped grooves for receiving and frictionally holding the ends of the strands adjacent the spools, and means for retaining said spools and elements on said arbor member.

6. A coil winding arbor for supporting a spool during the winding of a strand thereon comprising a rotatable member receivable in a spindle for rotation therewith, an element on said member provided with a pair of annular surfaces forming a rabbet for supporting the spool and engageable with the inner periphery and one end of said spool, a second element removably supported on said rotatable member engageable with the other end of said spool, and means for holding said elements in engagement with said spool, one of said elements having an annular groove adjacent said spool capable of frictionally holding a strand moved into said annular groove.

7. A coil winding arbor assembly for supporting a spool during the winding of a strand thereon comprising a rotatable supporting member, a first annular element on said supporting member, a second annular element removably mounted on said supporting member for rotation therewith engageable with said first element and forming an annular groove therewith for frictionally holding a strand moved into said groove, said second element being provided with an annular rabbet having surfaces engageable with the inner periphery and one end of a spool on which said strand is to be wound, a third annular element removably mounted on said supporting member and engageable with the other end of said spool, and means for holding said elements in assembled relation on said rotatable supporting member.

8. A coil winding arbor for simultaneously winding a plurality of strands onto a plurality of spools comprising rotatable means for coaxially and removably supporting a plurality of headed spools for rotation about their axes, and strand gripping means removably supported on said rotatable means adjacent the heads of said spools including pairs of cooperable strand engaging surfaces for frictionally holding the strands adjacent the heads of said spools.

9. A coil winding arbor comprising a plurality of spools on which strands are to be wound, a rotatable arbor member for supporting said spools thereon, means engageable with the ends of said spools for spacing them in a predetermined relation to each other and for providing cooperating opposed gripping surfaces for frictionally holding strands adjacent to said spools, and means for removably retaining said spools and said strand gripping means on said member.

10. A composite arbor for simultaneously winding a plurality of strands onto a plurality of headed spools comprising a rotary member, a plurality of composite annular spool supporting elements removably supported on said member for supporting a row of the spools thereon, each of said spool supporting elements comprising two parts mounted for limited longitudinal movement of one relative to the other, the parts of each of said elements having adjacent strand engaging faces forming an annular groove for receiving and frictionally gripping a strand, the parts of each element having annular oppositely disposed faces engageable with the heads of adjacent spools, one of said parts of each element having an axially extending portion engageable with the inner periphery of a spool for supporting it concentrically on said rotary support, and resilient means for urging the elements and the headed spools axially into engagement with one another.

11. An arbor assembly for winding a plurality of coils on spools having heads with notches therein comprising a rotatable arbor member, a plurality of annular spacing elements removably supported on said arbor member for supporting said spools in spaced and axially aligned relation to each other on said arbor member, said spacing elements comprising pairs of abutting annular members having adjacent strand engaging surfaces forming annular grooves capable of gripping portions of strands therein, one member of each of said spacing elements having an annular rabbet forming an annular shoulder for supporting a spool thereon and forming a wall engageable with one head of said spool, the other member of each of said elements being engageable with the other head of another spool, said wall having a notch therein alignable with the notch in the head of a spool supported on the spacing element to permit the strand in said groove to extend transversely through said notches in a position to be wound on the spool, and means for removably retaining a plurality of said spools and said elements in assembled and longitudinally compressed relation on the arbor member with the spools supported by and firmly held between the spacing elements and with the annular members of the spacing elements pressed against each other for yieldably gripping strands pushed into the grooves therebetween.

12. An arbor assembly for winding a plurality of coils on headed spools comprising a plurality of two-part spacing collars, means for securing the parts of each of the collars together for limited movement in an axial direction relative to each other, the two parts of each of said collars having abutting faces formed to provide an annular tapered groove for gripping a strand forced thereinto, one of said collar parts of each spacing collar being engageable with one head of a spool and having a portion for supporting the spool in coaxial alignment with the spacing collar, the other part of each spacing collar being engageable with the other head of another spool, a rotatable arbor member for supporting a plurality of said spacing collars with a plurality of spools supported on and between the spacing collars, and means for securing said spacing collars and the spools on said arbor member in abutting relation to each other.

References Cited in the file of this patent

UNITED STATES PATENTS

| | | |
|---|---|---|
| 594,989 | Finn | Dec. 7, 1897 |
| 766,936 | De Roseau | Aug. 9, 1904 |
| 1,093,146 | Planchon | Apr. 14, 1914 |
| 1,814,389 | Jacobsen | July 14, 1931 |
| 1,868,408 | Clinton | July 19, 1932 |
| 2,153,996 | Selvig | Apr. 11, 1939 |
| 2,424,021 | Cook | July 15, 1947 |
| 2,432,270 | Asbill | Dec. 9, 1947 |
| 2,563,642 | Colombu et al. | Aug. 7, 1951 |